United States Patent
Halland et al.

(10) Patent No.: US 7,946,796 B2
(45) Date of Patent: May 24, 2011

(54) PARTICLE SPREADER SYSTEM

(75) Inventors: Bruce R. Halland, West Fargo, ND (US); Kerry Johnson, Granite City, IL (US)

(73) Assignee: Custom Marketing Company, Inc., West Fargo, ND (US)

( * ) Notice: Subject to any disclaimer, the term of this patent is extended or adjusted under 35 U.S.C. 154(b) by 832 days.

(21) Appl. No.: 11/684,526

(22) Filed: Mar. 9, 2007

(65) Prior Publication Data

US 2008/0219817 A1 Sep. 11, 2008

(51) Int. Cl.
*B65G 3/00* (2006.01)
(52) U.S. Cl. .................................. 414/299; 414/303
(58) Field of Classification Search .............. 414/299, 414/303, 133; 198/530; 49/275
See application file for complete search history.

(56) References Cited

U.S. PATENT DOCUMENTS

| | | | |
|---|---|---|---|
| 992,781 A * | 5/1911 | Lallance | 254/131 |
| 1,694,166 A * | 12/1928 | Doty | 49/275 |
| 2,348,056 A * | 5/1944 | Cheely et al. | 414/300 |
| 3,064,833 A | 11/1962 | Von Ruden | |
| 3,966,124 A * | 6/1976 | Sukup | 239/666 |
| 4,040,529 A | 8/1977 | Wurdeman et al. | |
| 4,164,327 A | 8/1979 | Clark | |
| 4,261,679 A * | 4/1981 | Dillman | 414/299 |
| 4,318,511 A | 3/1982 | Clark | |
| 4,342,532 A | 8/1982 | Voegele | |
| 4,397,423 A | 8/1983 | Beaver et al. | |
| 4,437,613 A | 3/1984 | Olson | |
| 4,611,965 A | 9/1986 | Dixon et al. | |
| 4,902,185 A | 2/1990 | Dixon et al. | |
| 5,372,467 A | 12/1994 | Harris | |
| 5,924,242 A * | 7/1999 | Macari et al. | 49/55 |
| 5,950,694 A | 9/1999 | Jama et al. | |
| 6,471,029 B1 | 10/2002 | Pierce | |
| 6,923,389 B2 | 8/2005 | Shivvers | |
| 6,991,415 B1 * | 1/2006 | Anschultz | 414/299 |
| 7,549,252 B2 * | 6/2009 | Vaughn | 49/466 |

OTHER PUBLICATIONS

Grain Spreaders; p. 28 from Custom Marketing Catalog; West Fargo, ND; Mar. 9, 2007.

* cited by examiner

*Primary Examiner* — Joshua I Rudawitz
(74) *Attorney, Agent, or Firm* — Neustel Law Offices

(57) ABSTRACT

A particle spreader system for efficiently evenly distributing particles (i.e. grain, seed, etc.) within a storage bin. The particle spreader system generally includes a manifold including a plurality of discharge openings and a lower opening, a plurality of gates attached to the manifold, wherein the gates incrementally adjust about the discharge openings and a plurality of chutes attached to the manifold, wherein the plurality of chutes extend outwardly from the plurality of discharge openings. The manifold suspendedly attaches to an inlet of a storage bin, wherein the manifold receives a mass of particles via the inlet and wherein the gates regulates a flow of the mass of particles through the discharge openings.

10 Claims, 6 Drawing Sheets

PARTICLE SPREADER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to particle spreaders and more specifically it relates to a particle spreader system for efficiently evenly distributing particles (i.e. grain, seed, etc.) within a storage bin.

2. Description of the Related Art

Any discussion of the prior art throughout the specification should in no way be considered as an admission that such prior art is widely known or forms part of common general knowledge in the field.

Particle spreaders have been in use for years. Particle spreaders are utilized in many various storage bins, wherein one commonly utilized storage bin to secure substances is generally referred to as a grain bin. Typically, particle spreaders are utilized in grain bins to help evenly distribute substances (i.e. grain, seed, etc.) within the grain bin. The substances are generally dispensed within the grain bin through the peak or inlet of the bin and if a grain spreader is not utilized the substance generally piles higher in the middle then around the inner edges of the grain bin, thus resulting in a grain bin filled less than capacity.

The grain spreaders currently utilized generally require an electrical power source to operate. The grain spreaders also generally rotate, which in turn spreads the substances around the inner edges of the grain bin. There are also grain spreaders that do not utilize an electrical power source to rotate, but instead rotate utilizing the weight of the dispensing substance.

As with most mechanical or electrical devices, the more moving parts that the device includes the more chance for part failure, wherein replacing mechanical and electrical components generally leads to expensive repairs. It may also be difficult to service the grain spreader since the grain spreader is generally positioned at an upper end of the grain bin. Because of the general lack of efficiency and practicality in the prior art there is the need for a new and improved particle spreader system for efficiently evenly distributing particle (i.e. grain, seed, etc.) within a storage bin.

BRIEF SUMMARY OF THE INVENTION

The general purpose of the present invention is to provide a particle spreader system that has many of the advantages of the particle spreaders mentioned heretofore. The invention generally relates to a particle spreader which includes a manifold including a plurality of discharge openings and a lower opening, a plurality of gates attached to the manifold, wherein the gates incrementally adjust about the discharge openings and a plurality of chutes attached to the manifold, wherein the plurality of chutes extend outwardly from the plurality of discharge openings. The manifold suspendedly attaches to an inlet of a storage bin, wherein the manifold receives a mass of particles via the inlet and wherein the gates regulates a flow of the mass of particles through the discharge openings.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a particle spreader system for efficiently evenly distributing particles (i.e. grain, seed, etc.) within a storage bin.

Another object is to provide a particle spreader system that does not require an electrical power source.

Another object is to provide a particle spreader system that is securely attached to a storage bin.

Another object is to provide a particle spreader system that efficiently controls the flow of the substances via adjustable gates.

An additional object is to provide a particle spreader system that attaches upon a variety of storage bins.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
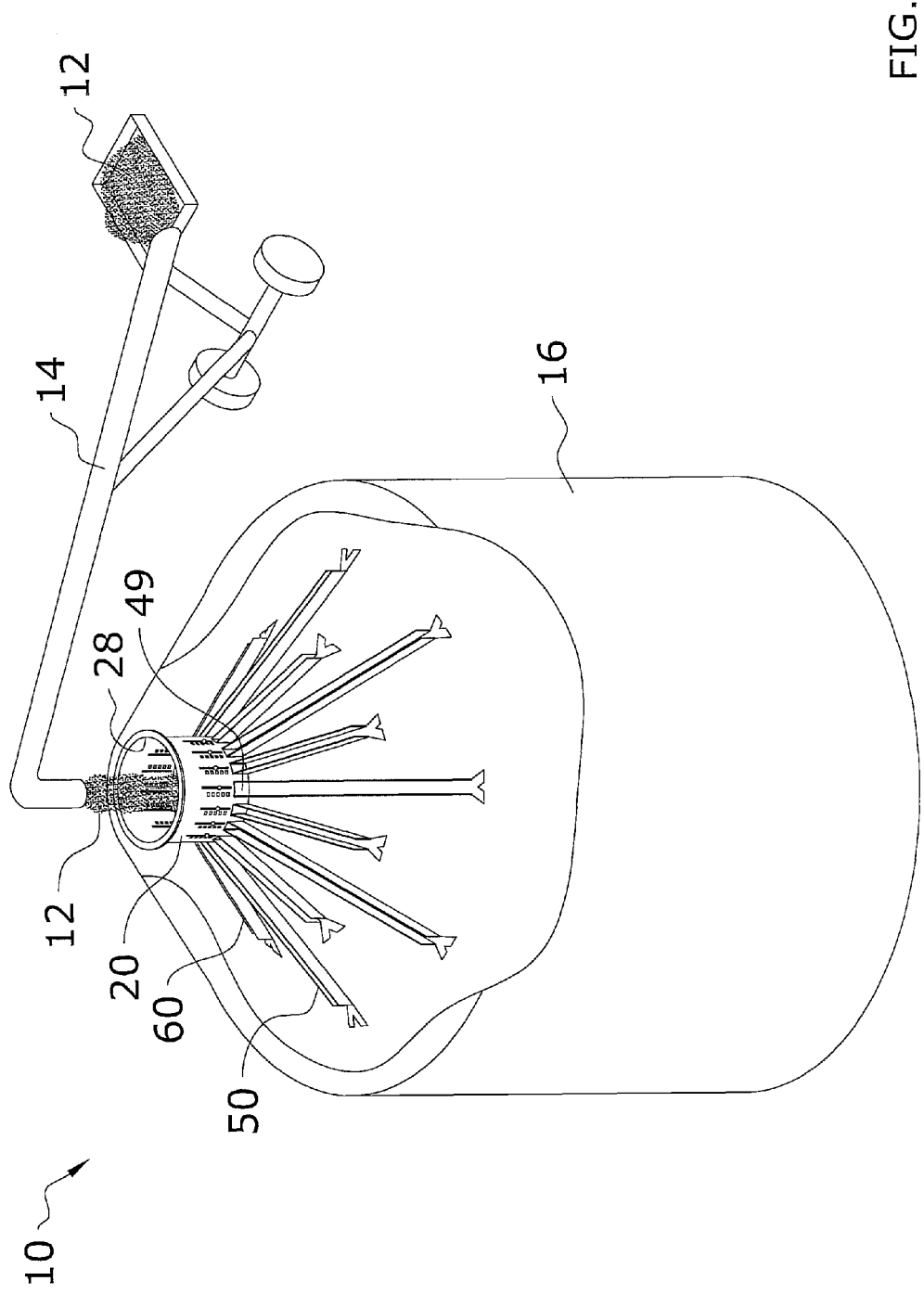
FIG. 1 is an upper perspective view of the present invention in use with the storage bin partially cut-away.

Turning now descriptively to the drawings, in which similar reference characters denote similar elements throughout the several views, FIGS. 1 through 6 illustrate a particle spreader system 10, which comprises a manifold 20 including a plurality of discharge openings 49 and a lower opening 34, a plurality of gates 40 attached to the manifold 20, wherein the gates 40 incrementally adjust about the discharge openings 49 and a plurality of chutes 50, 60 attached to the manifold 20, wherein the plurality of chutes 50, 60 extend outwardly from the plurality of discharge openings 49. The manifold 20 suspendedly attaches to an inlet 17 of a storage bin 16, wherein the manifold 20 receives a mass of particles 12 via the inlet 17 and wherein the gates 40 regulates a flow of the mass of particles 12 through the discharge openings 49.

The storage bin 16 may be comprised of a plurality of various structures, wherein the storage bin 16 preferably stores a mass of particles 12 (i.e. grain, seed, etc.). In the described usage of the present invention, the storage bin 16 is comprised of a grain bin structure as illustrated in FIG. 1. The inlet 17 of the storage bin 16 is preferably positioned upon the roof structure of the storage bin 16. The inlet 17 described in the usage of the present invention is generally associated with receiving the particles 12 to store in the storage bin 16. The inlet 17 is further generally comprised of a circular configuration and is large enough to receive a flow of the particles 12 from a transfer member 14 as illustrated in FIG. 1, wherein the transfer member 14 is preferably comprised of an auger configuration. It is appreciated that the present invention utilizes solely gravitational forces in distributing the particles 12 within the storage bin 16.

B. Manifold

Figure 3:
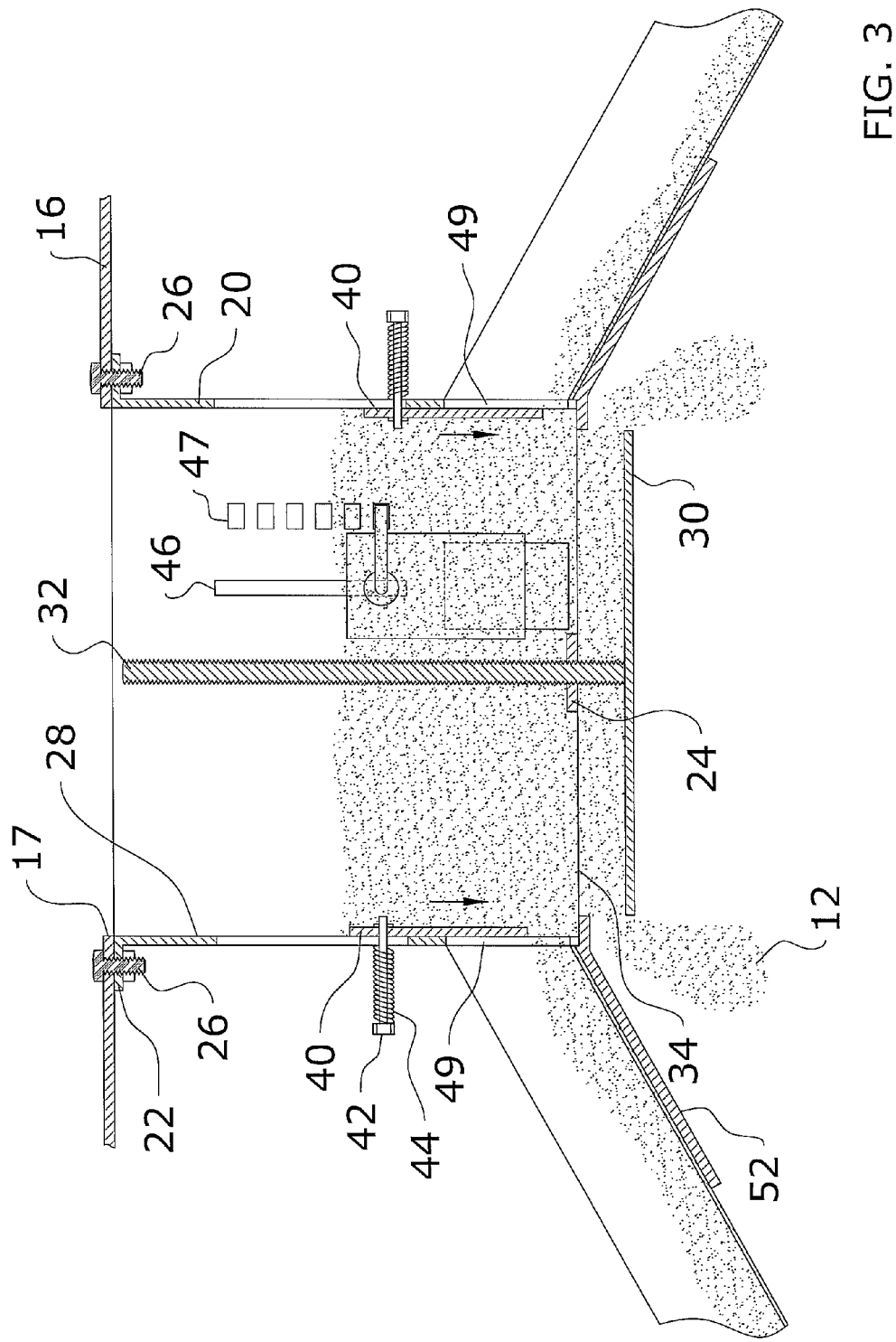
FIG. 3 is a cross-sectional view of the present invention with the gates closed.
Figure 4:
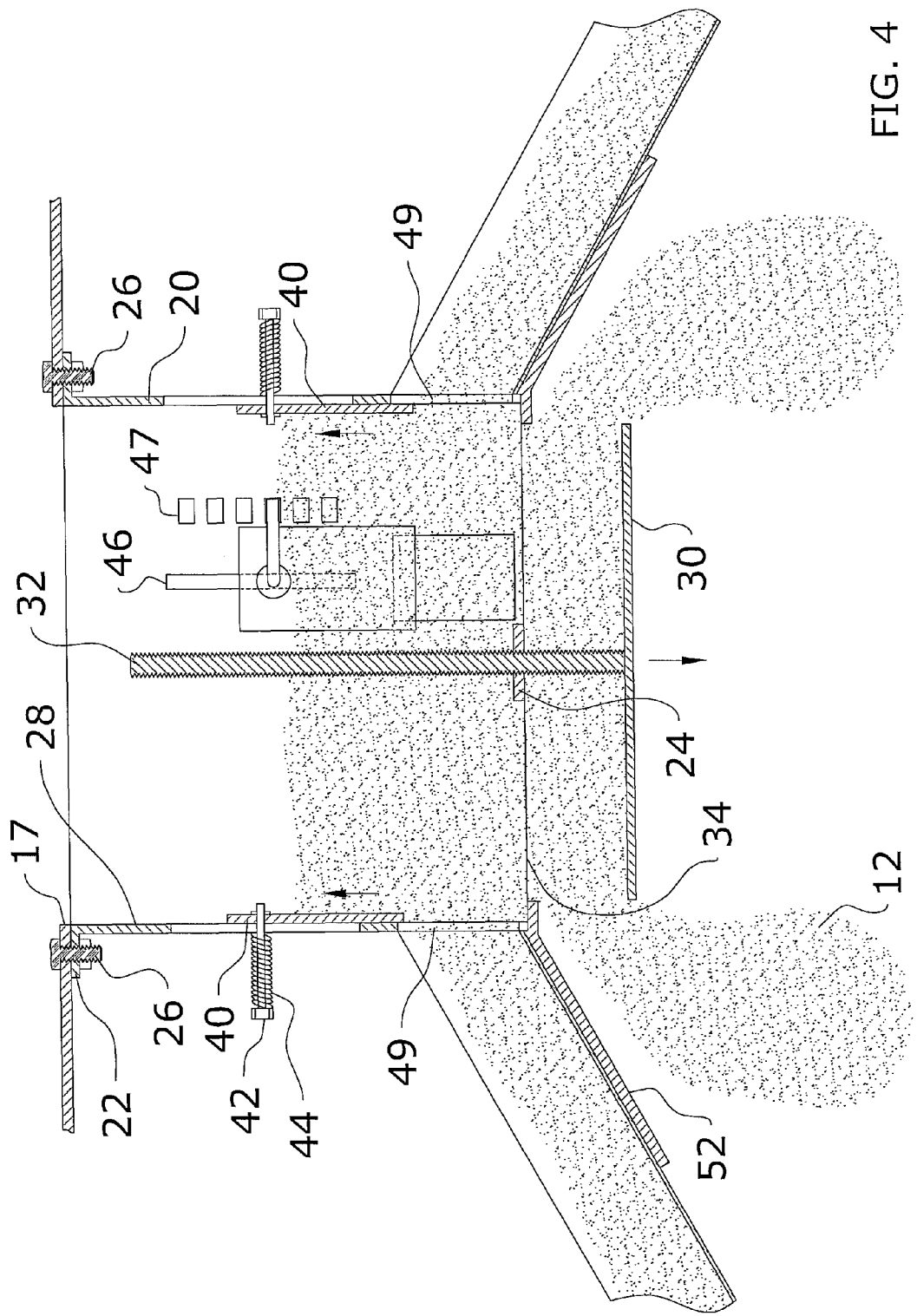
FIG. 4 is a cross-sectional view of the present invention with the gates open.

The manifold 20 is suspendedly attached to the storage bin 16 and is further attached adjacent to the inlet 17 as shown in FIGS. 3 and 4. The manifold 20 includes an intake opening 28 positioned adjacent to the inlet 17. The manifold 20 receives the mass of particles 12 via the intake opening 28. The intake opening 28 is further concentric with the inlet 17. A diameter of the manifold 20 is preferably substantially similar to a diameter of the inlet 17. The manifold 20 also preferably shares a concentric axis with the inlet 17 to ensure the manifold 20 receives all of the particles 12 dispensed within the storage bin 16 via the inlet 17.

Figure 2:
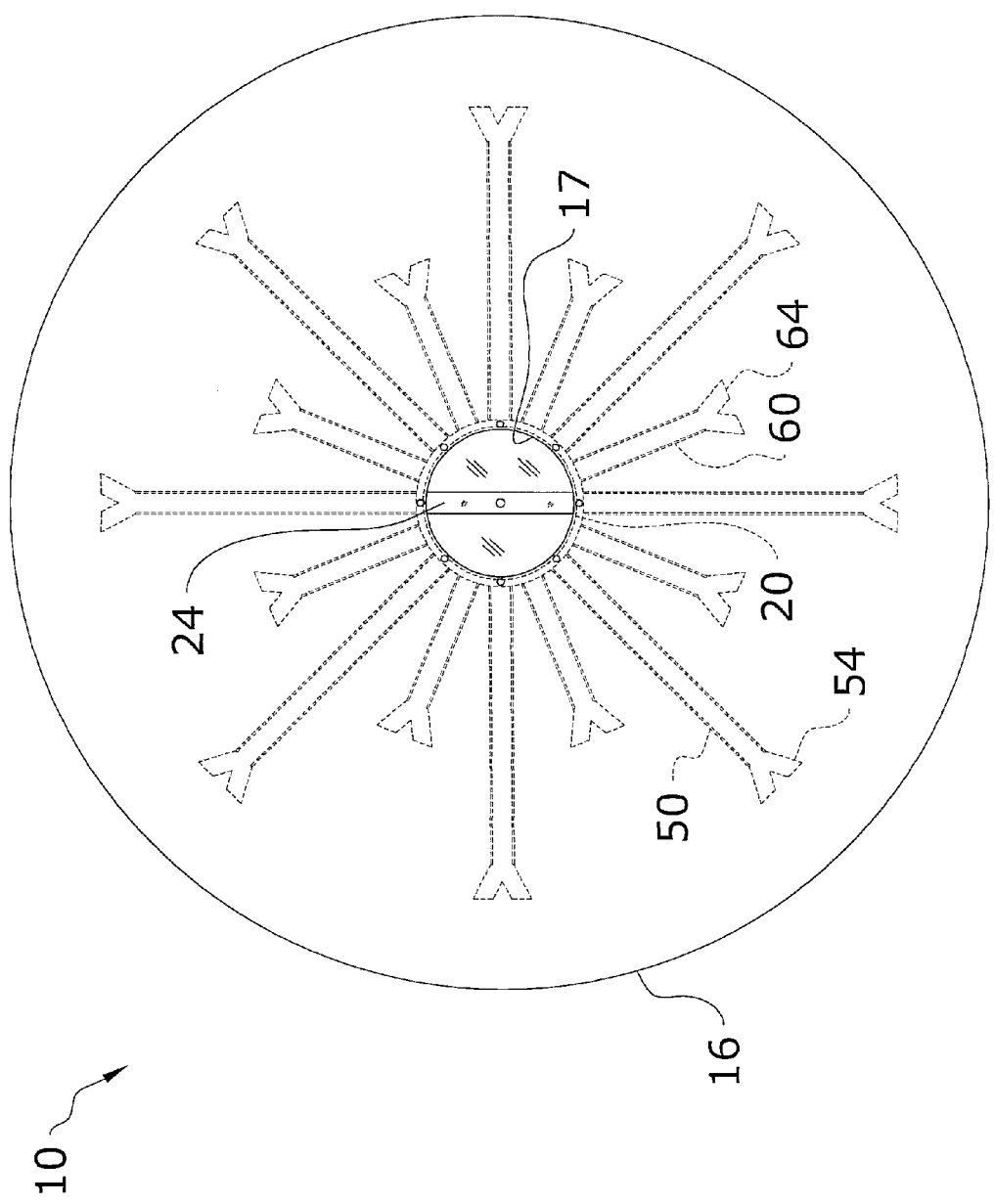
FIG. 2 is a top view of the present invention.

The manifold 20 includes a lip 22, wherein the lip 22 forms a cincture structure around the upper end of the manifold 20. The lip 22 preferably substantially extends outward from the upper end of the manifold 20 and is positioned adjacent to the outer edges of the inlet 17 of the storage bin 16 as shown in FIGS. 2 through 4. A plurality of connecting members 26 preferably secure the manifold 20 to the bin 16, via extending through the lip 22 and the outer edges of the inlet 17 as illustrated in FIGS. 3 and 4.

The connecting members 26 may be comprised of a plurality of configurations, such as but not limited to bolts or screws. The present invention is thus suspended from the inlet 17 of the storage bin 16 via the lip 22. It is appreciated that the present invention may attach adjacent to the inlet 17 of the storage bin 16 in a plurality of various methods rather than the preferred embodiment, such as but not limited to resting the lip 22 around the outer edges of the inlet 17 of the storage bin 16.

The manifold 20 may be comprised of a plurality of materials, such as but not limited to metal or plastic. The manifold 20 is also preferably comprised of a cylindrical shaped structure as shown in FIGS. 1 and 2. The manifold 20 is further preferably comprised of a tubular structure, wherein the upper end of the manifold 20 is substantially open to allow passage of the particles 12 and the lower end of the manifold 20 is partially open to allow passage of a desired amount of particles 12.

The manifold includes a cross member 24 extending across the inside of the manifold 20 as shown in FIGS. 2 through 4. The cross member 24 preferably includes an aperture to threadably receive a adjustment member 32 of the lower plate 30, wherein the lower plate 30 adjusts about the cross member 24. The cross member 24 may be comprised of a plurality of configurations all which allow passage of the particles 12 through the manifold 20 as shown in FIGS. 2 through 4.

The manifold 20 also includes a plurality of discharge openings 49 positioned about a circumference of the manifold 20 as shown in FIG. 1. The discharge openings 49 form a cincture structure about the manifold 20. The discharge openings 49 are further preferably positioned substantially near the lower end of the manifold 20, wherein a build up of the particles 12 about the lower plate 30 spills through the discharge openings 49 and down the chutes 50, 60 as illustrated in FIG. 4.

The discharge openings 49 are also perpendicular to the lower plate 30 and the inlet 17, wherein particles 12 traveling through the discharge openings 49 are directed towards the inner sides of the storage bin 16 and particles 12 traveling through the lower opening 34 are directed towards the center of the storage bin 16 as illustrated in FIGS. 1 and 4. The discharge openings 49 may be comprised of a plurality of configurations, such as but not limited to rectangular or circular. The configuration of the discharge openings 49 further preferably mimics the configuration of the chutes 50, 60, wherein if tubing is utilized with the chutes 50, 60 a circular discharge opening 49 is preferably utilized.

The manifold 20 also preferably includes a plurality of slots 47 and a channel 46 positioned above each discharge opening 49. The slots 47 and the channel 46 receive the adjustment device 42, wherein the adjustment device 42 is attached to and regulates the height of the gate 40 about the discharge openings 49. The slots 47 and the channel 46 are also vertically oriented about the manifold 20 as illustrated in FIGS. 1, 3 and 4. The slots 47 are further vertically stacked about the manifold 20.

C. Gates

The lower end of the manifold 20 is preferably selectively sealed via the lower plate 30 as shown in FIGS. 3 and 4. The lower plate 30 preferably adjusts vertically about the lower end of the manifold 20, wherein the flow rate of the particles 12 through the lower opening 34 is adjustable and wherein the operator may desire the flow rate of the particles 12 through the lower opening 34 to vary along with varied size particles 12. The lower plate 30 is parallel and concentric to the inlet 17 and the lower opening 34 as shown in FIGS. 3 and 4.

The lower plate 30 includes an adjustment member 32. The adjustment member 32 adjusts the lower plate 30 about the manifold 20. The adjustment member 32 is further preferably threaded formed, wherein the adjustment member 32 threadably adjusts the lower plate 30 vertically up and down about the cross member 24 as shown in FIGS. 3 and 4.

The gate 40 selectively covers the discharge openings 49 of the manifold 20. The gate 40 further incrementally adjusts about the manifold 20, wherein the operator may desire the flow rate of the particles 12 through the discharge openings 49 to vary along with varied size particles 12. The gate 40 further vertically adjusts along the inner surface of the manifold 20 as shown in FIGS. 3 through 6. The gate 40 is further parallel to the discharge opening 49 and perpendicular to the lower plate 30. The gate 40 is also preferably comprised of a substantially similar size and configuration as the corresponding discharge opening 49.

Figure 5:
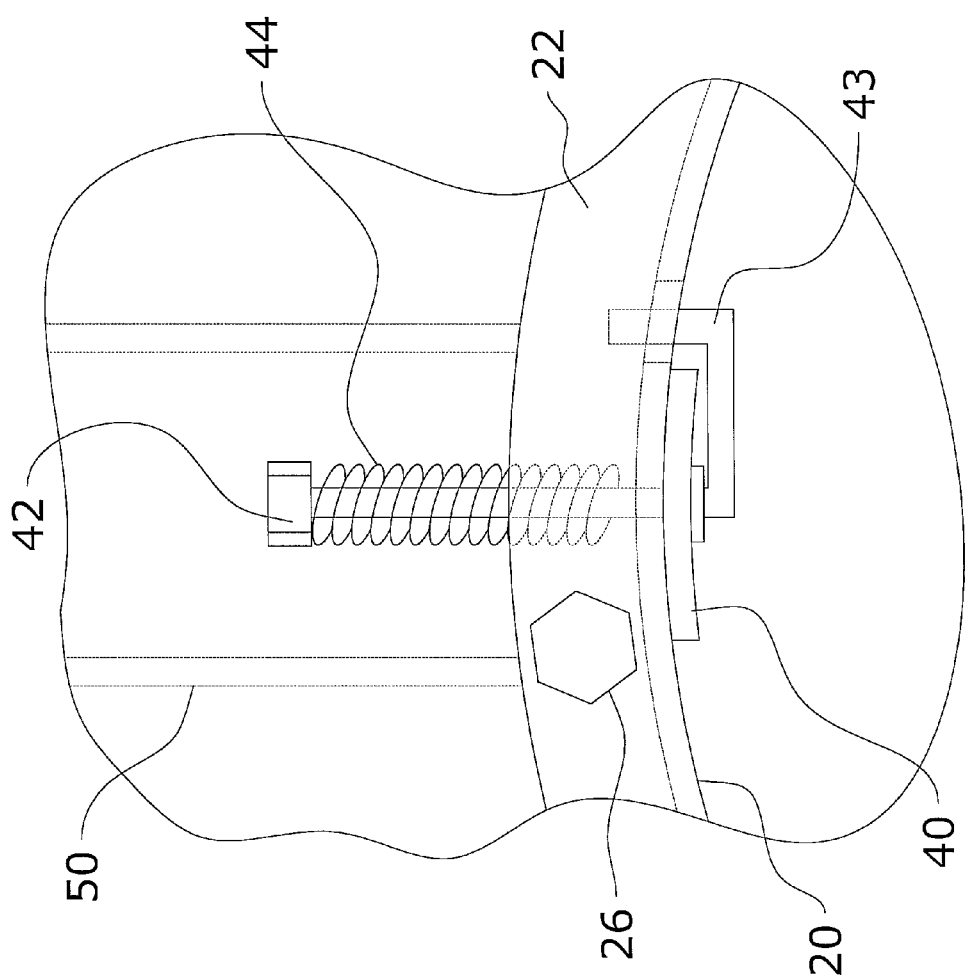
FIG. 5 is a magnified view of the lower plate during a locked state.

The gate 40 includes an adjustment device 42 as shown in FIGS. 3 through 6. The adjustment device 42 preferably horizontally adjusts about the manifold 20. A spring 44 is preferably positioned between an outer end of the adjustment device 42 and the outer surface of the manifold 20, wherein the spring 44 actuates the adjustment device 42. The spring 44 is compressed when adjusting the height of the gate 40 about the discharge opening 49 and is allowed to decompress when locking the gate 40 at a desired height as shown in FIG. 5.

The adjustment device 42 further preferably extends through a channel 46 in the manifold 20 and the second plate, wherein when the adjustment device 42 is being vertically adjusted the adjustment device 42 travels along and within the channel 46. The adjustment device 42 on the inside of the manifold 20 preferably extends toward the slots 47 as shown in FIGS. 3 through 6. The adjustment device 42 may also include a spacer to provide a secure locking connecting of the securing portion 43 within the slot 47.

Figure 6:
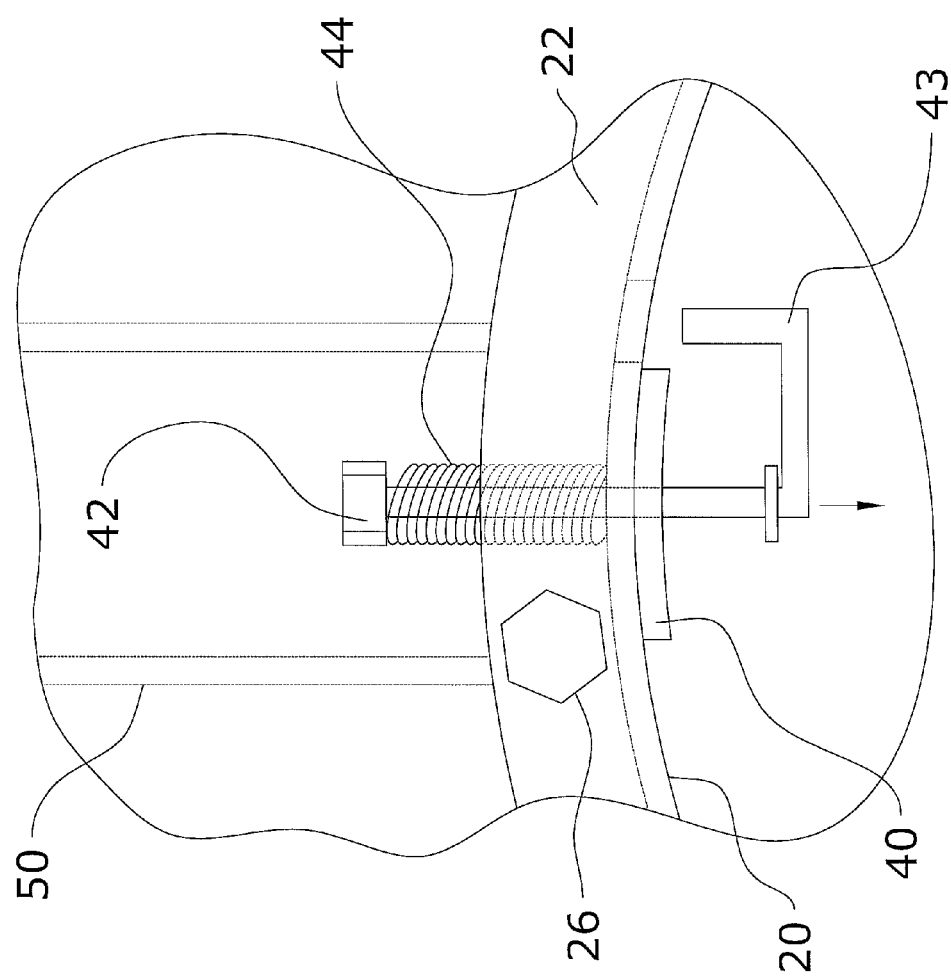
FIG. 6 is a magnified view of the lower plate during an unlocked state.

The adjustment device 42 preferably includes a securing portion 43 adjacent the slots 47. The securing portion 43 preferably extends within the slots 47 when the adjustment device 42 is in the locked position as shown in FIGS. 3 through 5. When the second plate is being adjusted about the discharge opening 49 the securing portion 43 is pushed out of the slot 47 to allow the adjustment device 42 and the gate 40 to vertically adjust as shown in FIG. 6. It is appreciated that the gate 40 may adjust about the manifold 20 and discharge openings 49 in a plurality of methods rather than the described embodiment.

D. Chutes

Extending from the discharge openings 49 about the outer surface of the manifold 20 is a plurality of chutes 50, 60, wherein the chutes 50, 60 are attached around a substantial portion of the outer perimeter of the discharge openings 49. The chutes 50, 60 also preferably radiate outwardly from the manifold 20 as illustrated in FIGS. 1 and 2. The chutes 50, 60 preferably extend at a downward angle away from the manifold 20, wherein gravitational force directs the particles 12 down the chutes 50, 60 as illustrated in FIGS. 1, 3 and 4.

The chutes 50, 60 preferably extend from each one of the discharge openings 49, wherein the only particles 12 not traveling through the chutes 50, 60 are the particles 12 spilling through the lower opening 34. The chutes 50, 60 may be comprised of a plurality of materials, such as but not limited to metal or plastic. The chutes 50, 60 may also be comprised of a plurality of configurations, such as but not limited to tubing or rectangular-shaped troughs.

The plurality of chutes 50, 60 preferably include a plurality of first chutes 50 and a plurality of second chutes 60. The first chutes 50 and the second chutes 60 are preferably comprised of different lengths, wherein the first chutes 50 direct the particles 12 toward an inside edge of the storage bin 16 and the second chutes 60 direct the particles 12 between the inside edge and the center of the storage bin 16 as shown in FIGS. 1 and 2. It is appreciated that the present invention may include a plurality of different length chutes 50, 60 rather than the described preferred embodiment.

The first chutes 50 and the second chutes 60 are also preferably alternately spaced about the manifold 20 to ensure that the particles 12 are evenly distributed within the storage bin 16 as shown in FIGS. 1 and 2. The first chutes 50 and the second chutes 60 may also include a support member 52 to reinforce the attachment between the chute 50, 60 and the manifold 20 as shown in FIGS. 3 and 4. It is appreciated that the support member 52 may only be needed upon the first chutes 50, wherein the first chutes 50 are substantially longer than the second chutes 60.

The chutes 50, 60 also preferably include a distributing member 54, 64 attached to the chute 50, 60 opposite the manifold 20 as shown in FIGS. 1 and 2. The distributing member 54, 64 is preferably comprised of a fork configuration, wherein the distributing member 54, 64 further directs the particles 12 in two separate directions to further ensure an evenly distributed mass of particles 12 within the storage bin 16. It is appreciated that the distributing members 54, 64 may be comprised of a plurality of configurations all which help to evenly distribute the particles 12 within the storage bin 16. It is also appreciated that the chutes 50, 60 and the distributing members 54, 64 may be comprised of separate structures or an integrally formed structure.

E. In Use

In use, the assembled present invention is suspended from the inlet 17 of the storage bin 16, wherein the lip 22 preferably attaches about the inlet 17 via the attachment members 24. The lower plate 30 and the gate 40 are also adjusted to a desired position to achieve a desired flow rate of the particles 12 via adjustment of the adjustment member 32 and the adjustment device 42. The particles 12 may now be dispensed within the inlet 17 and the intake opening 28 of the manifold 20 via the transfer member 14 as illustrated in FIG. 1. The particles 12 subsequently travel through the discharge openings 49 and the lower opening 34 thus evenly distributing the particles 12 within the storage bin 16 as illustrated in FIG. 4.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A particle spreader system, comprising:

a manifold including sidewalls and an upper end, said upper end having an intake opening and said sidewalls having a plurality of discharge openings extending therethrough, wherein said upper end of said manifold suspendedly attaches to a storage bin adjacent to an inlet;

wherein said inlet is adjacent to said intake opening;

wherein said manifold includes a plurality of slots adjacent each of said discharge openings, wherein said plurality of slots are incrementally spaced in a vertical manner and wherein said plurality of slots extend through said sidewalls;

wherein said manifold includes a plurality of channels vertically oriented and extending through said sidewalls, each said channel is adjacent a group of said plurality of slots;

a plurality of gates slidably attached to said manifold, wherein said plurality of gates selectively cover said plurality of discharge openings;

a plurality of adjustment devices attached to said plurality of gates, said plurality of adjustment devices each extending through a respective said channel from an exterior side of said sidewalls to an interior side of said sidewalls and each said channel is adapted to extend through one of said plurality of slots, said interior side adapted to receive a mass of particles;

wherein said plurality of adjustment devices incrementally extend within said plurality of slots to adjust a relative vertical position of said plurality of gates with respect to said plurality of discharge openings to regulate a flow of a mass of particles therethrough;

wherein each said adjustment device has a spring retained upon said adjustment device on said exterior side of said sidewalls and has a hook-shaped securing portion adapted to extend on said interior side, said spring provides a biasing force upon said adjustment device to force said hook-shaped securing portion within one of said plurality of slots and toward said exterior side of said sidewalls; and a plurality of chutes attached to said manifold, wherein said plurality of chutes extend outwardly from said plurality of discharge openings.

2. The particle spreader system of claim 1, wherein said plurality of adjustment devices mechanically attach said plurality of gates to said manifold at pre-determined increments.

3. The particle spreader system of claim 1, wherein said plurality of discharge openings are positioned about a perimeter of said manifold.

4. The particle spreader system of claim 1, wherein said manifold includes a lower opening, wherein said lower opening is positioned about a bottom end of said manifold.

5. The particle spreader system of claim 4, wherein said lower opening is substantially perpendicular to said plurality of discharge openings.

6. The particle spreader system of claim 4, including a lower plate attached to said manifold opposite said inlet, wherein said lower plate selectively adjusts about said lower opening.

7. The particle spreader system of claim 6, wherein said plurality of gates are substantially perpendicular to said lower plate.

8. The particle spreader system of claim 6, wherein said lower plate regulates a flow of a mass of particles through said lower opening.

9. The particle spreader system of claim 8, wherein said lower plate threadably adjusts about said lower opening.

10. A storage pin and particle spreader, comprising:
a storage bin having an inlet;
a manifold suspended from said storage bin;
said manifold having an upper end, a lower end, and sidewalls between thereof, said upper end having an intake opening, said sidewalls having a plurality of discharge openings spaced around a perimeter of said sidewalls, and said lower end having a lower opening;
wherein said manifold includes a plurality of slots adjacent each of said discharge openings, wherein said plurality of slots are incrementally spaced in a vertical manner and wherein said plurality of slots extend through said sidewalls;
wherein said manifold includes a plurality of channels vertically oriented and extending through said sidewalls, each said channel is adjacent to and parallels a group of said plurality of slots;
a plurality of gates secured over said plurality of discharge openings, wherein said plurality of gates adjust in a vertical position relative said plurality of discharge openings to regulate a flow of a mass of particles through said plurality of discharge openings;
a plurality of adjustment devices attached to said plurality of gates, said plurality of adjustment devices each extending through a respective said channel from an exterior side of said sidewalls to an interior side of said sidewalls and each said channel is adapted to extend through one of said plurality of slots;
wherein said plurality of adjustment devices incrementally extend within said plurality of slots to adjust a relative vertical position of said plurality of gates with respect to said plurality of discharge openings to regulate a flow of a mass of particles therethrough;
wherein each said adjustment device has a spring retained upon said adjustment device on said exterior side of said sidewalls and has a hook-shaped securing portion adapted to extend on said interior side, said spring provides a biasing force upon said adjustment device to force said hook-shaped securing portion within one of said plurality of slots;
a lower plate attached to said manifold opposite said inlet and adjacent said lower opening;
an adjustment member extending substantially vertically upwards from said lower plate and being fixed to said lower plate, said adjustment member connected to said manifold in a threaded manner adjacent said lower opening, said adjustment member threadably adjusts in a vertical manner relative said manifold to lower or raise said lower plate relative said lower opening and retain said lower plate perpendicular to said plurality of gates both in a raised position of said lower plate and a lowered position of said lower plate, said lower plate restricting a flow of a mass of particles through said lower opening in said raised position and said lower plate permitting a flow of a mass of particles through said lower opening in said lowered position; and
a plurality of chutes attached to said manifold, wherein said plurality of chutes extend outwardly from said plurality of discharge openings.

\* \* \* \* \*